July 9, 1929.  J. RUTHERFORD  1,720,059
FISHING BASKET
Filed Aug. 1, 1928

INVENTOR
JOHN RUTHERFORD
ATTORNEY.

Patented July 9, 1929.

1,720,059

UNITED STATES PATENT OFFICE.

JOHN RUTHERFORD, OF LONG BEACH, CALIFORNIA.

FISHING BASKET.

Application filed August 1, 1928. Serial No. 296,641.

This invention relates to a fishing tool and particularly to that type known as a basket, in which a member having bendable fingers on the bottom thereof, is run into the well and these fingers are then bent around the lost object in the bottom of the hole. The difficulty with this type of tool has been that these bendable fingers would catch on collars or other projections in the casing and would be bent before the bottom of the hole was reached.

An object of my invention is to provide a protecting sleeve for the basket, said sleeve extending over and protecting the bendable fingers.

Another object is to provide a protecting sleeve for a basket fishing tool which uncovers the basket upon rotation of the drill pipe or tubing.

A further object is to provide a fishing basket of the character described, which is simple in construction, inexpensive to manufacture and effective in operation.

Other objects, advantages, and features, of invention may appear from the accompanying drawing, the subjoined detailed description, and the appended claims.

In the drawing

Figure 1:
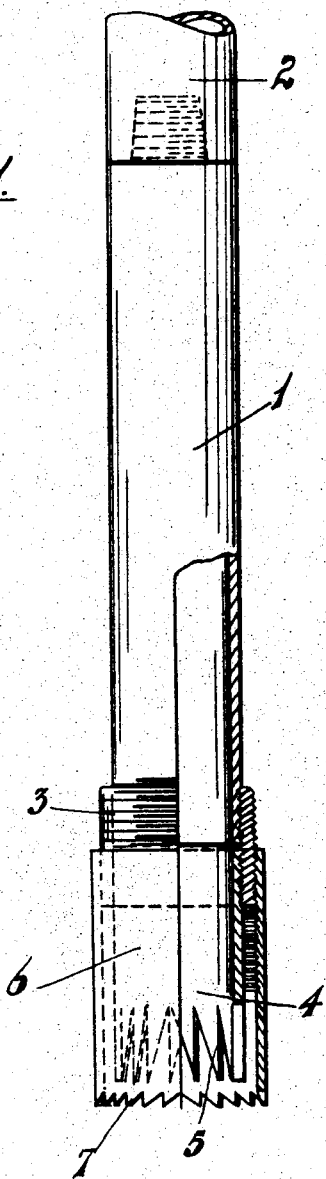
Fig. 1 is a side elevation of my fishing basket with parts broken away.
Figure 2:
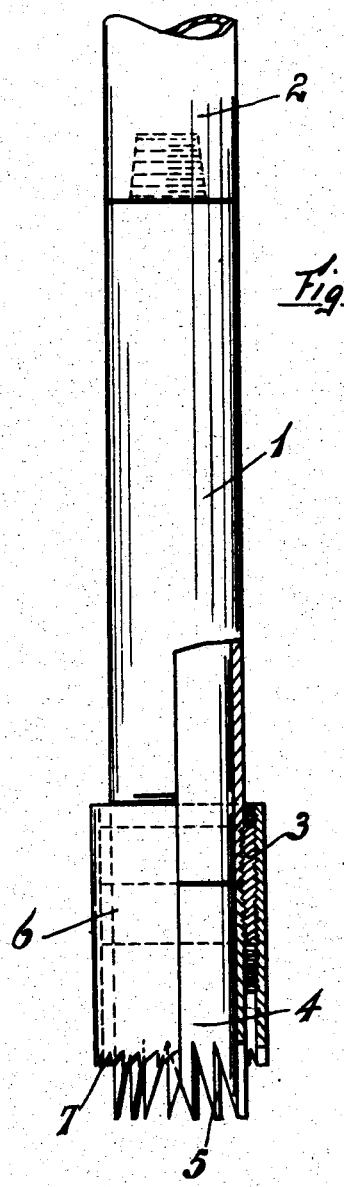
Fig. 2 is a side elevation of the fishing basket with parts broken away and the protecting sleeve is elevated to expose the basket.

Referring more particularly to the drawing:

The numeral 1 indicates a tubular body which is secured to the lower end of the drill pipe, tubing or the like 2. A fitting is screwed on to the bottom of the body 1 and this fitting is threaded both inside and outside. The basket 4 screws into the fitting 3 and the lower end thereof, and this basket is provided with the bendable fingers 5. A protecting sleeve 6 is threaded on the inside thereof, and screws on to the outside threads of the fitting 3.

When the tool is run into the hole, the sleeve 6 is in the position shown in Fig. 1, so that the fingers 5 of the basket are protected and cannot engage any projecting parts on the inside of the casing.

The bottom of the sleeve 6 is preferably toothed or serrated as at 7, so that this sleeve will engage the bottom of the hole and will be therefore non-rotatably held. When the tubing 2 is rotated, the sleeve 6 will remain stationary and the basket 4 will be projected below the bottom thereof. As soon as the fingers project below the sleeve, they will be bent inwardly and thus close around the lost article in the well.

Having described my invention, I claim:

1. A basket fishing tool comprising a tubular body, a basket secured to the lower end of said body, a sleeve extending over the basket, said sleeve being screwed on to the body whereby the sleeve may be raised above the basket on rotation of the body.

2. A basket fishing tool comprising a tubular body, a fitting screwed on to the lower end of the body, a basket screwed in to the fitting and a protective sleeve screwed on to the outside of the fitting.

3. A basket fishing tool comprising a tubular body, a fitting screwed on to the lower end of the body, a basket screwed in to the fitting and a protective sleeve screwed on to the outside of the fitting, said sleeve being formed with notches in the lower edge thereof, whereby it is non-rotatably held when in the well.

In testimony whereof, I affix my signature.

JOHN RUTHERFORD,